W. J. VAN OSDEL.
ROTARY ENGINE.
APPLICATION FILED FEB. 3, 1919.

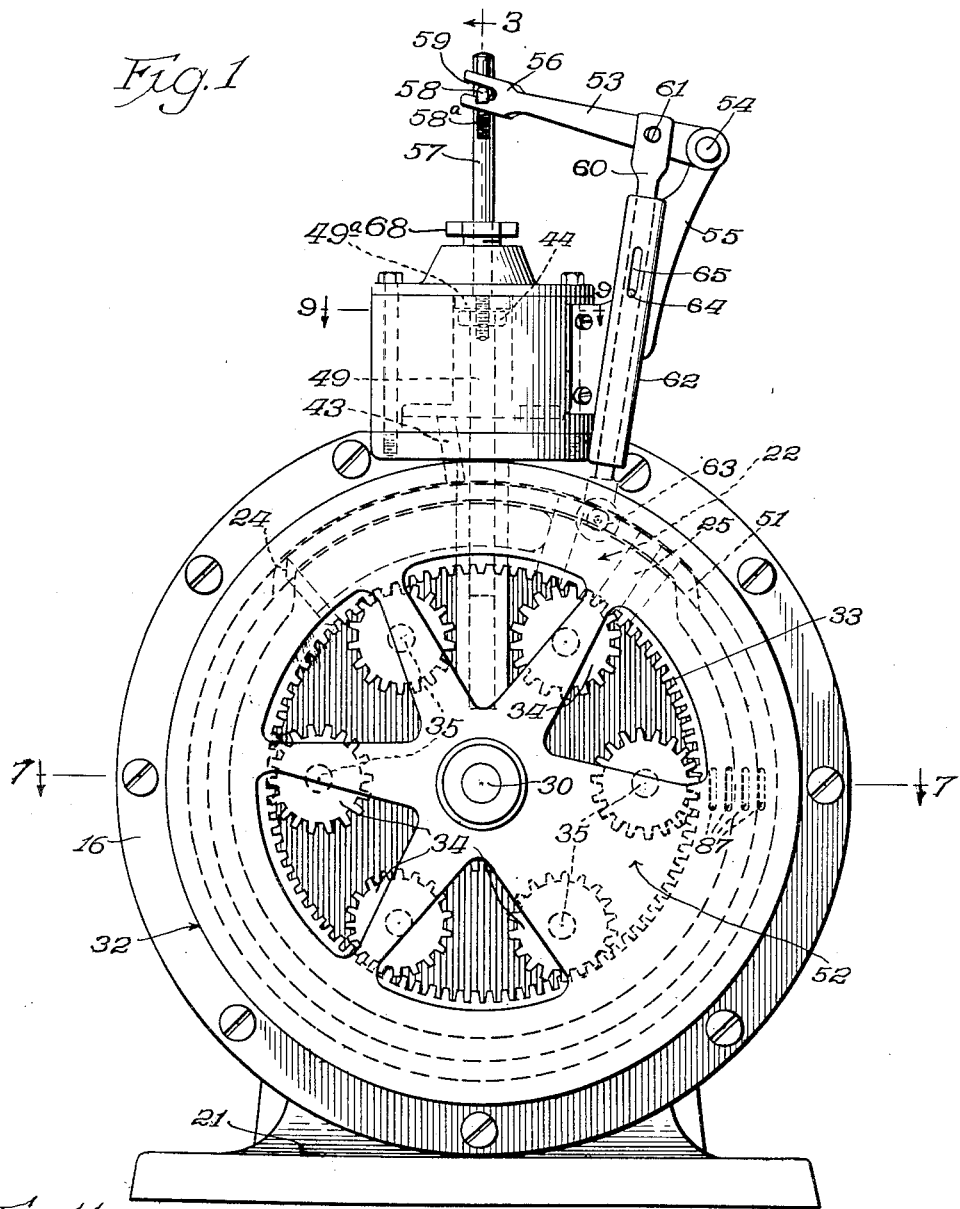
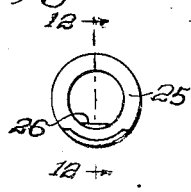
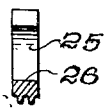

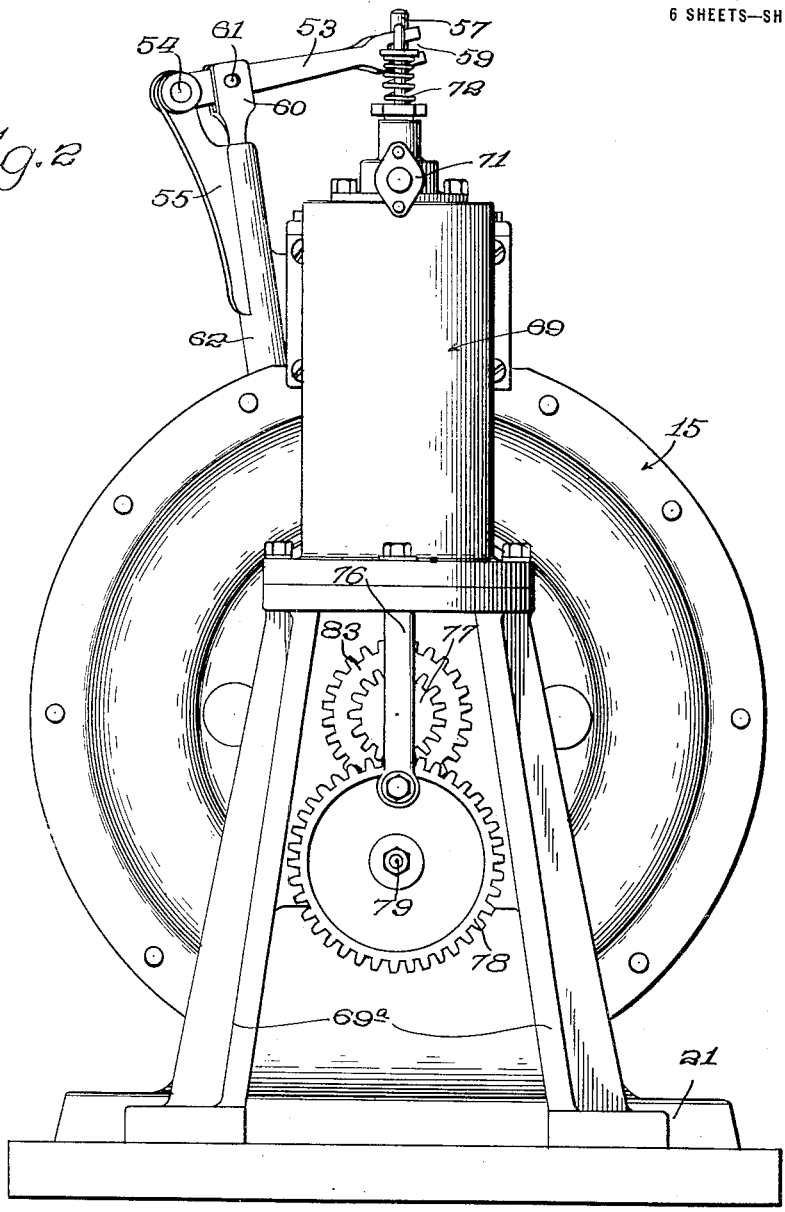

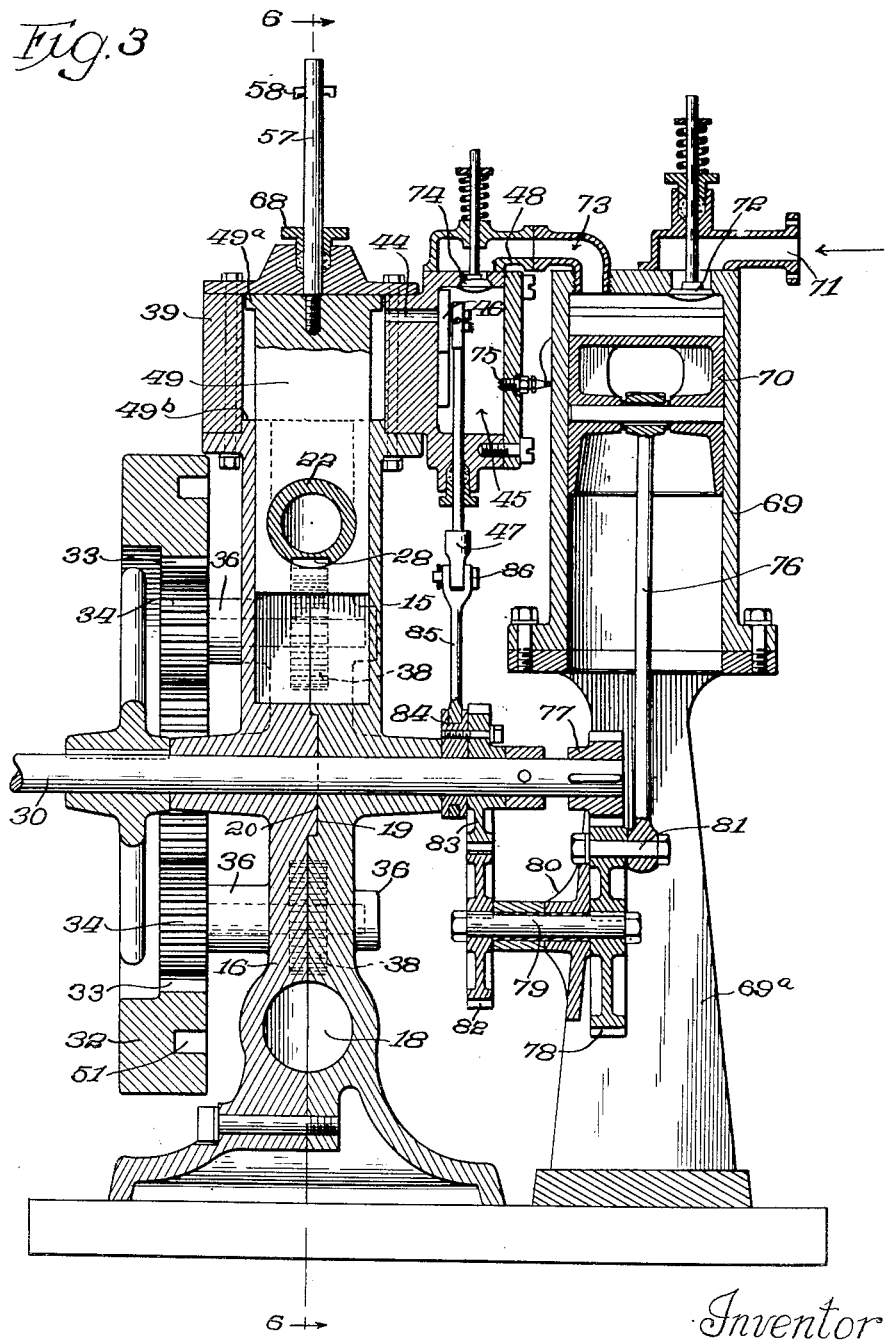

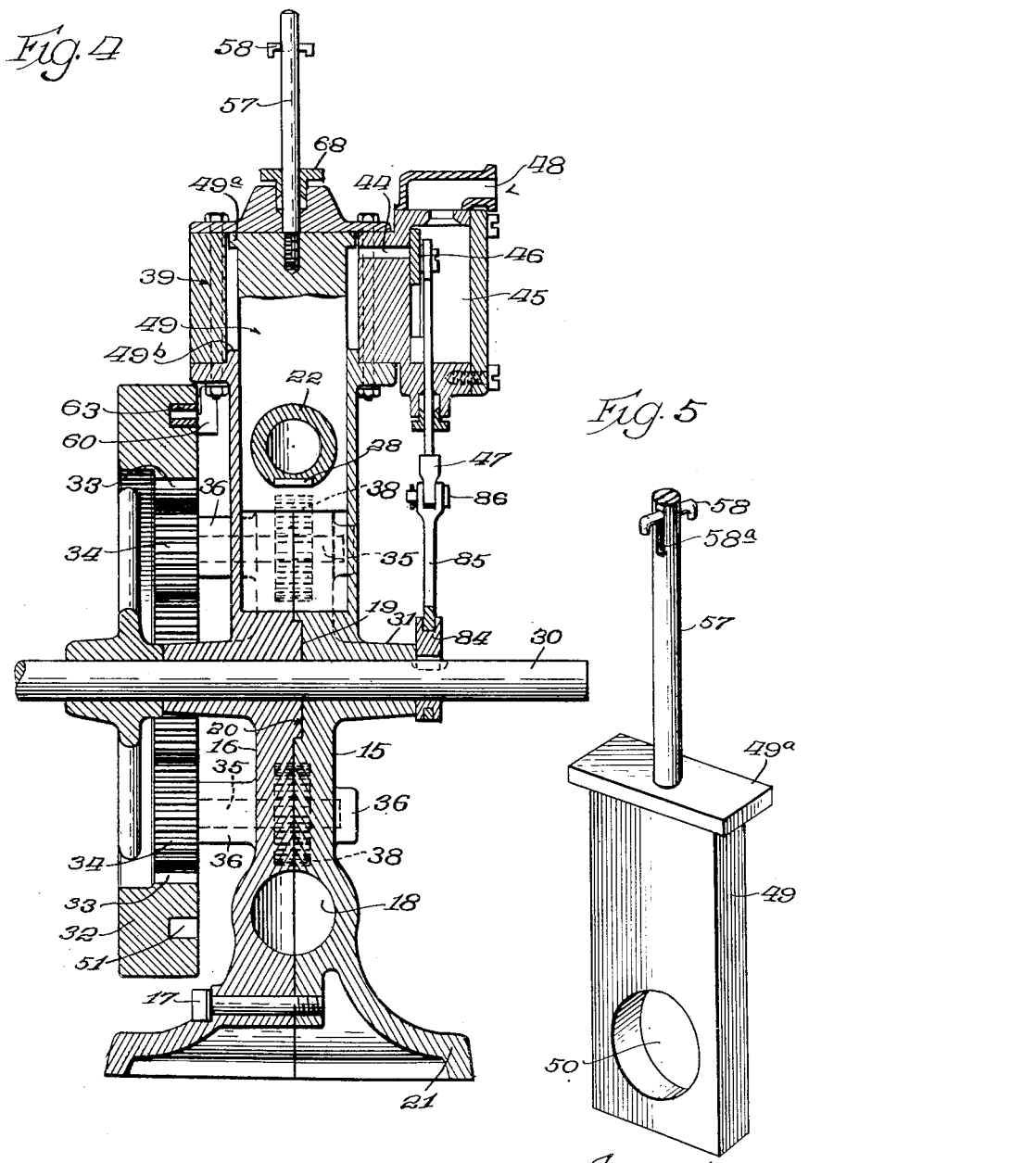

1,351,933.

Patented Sept. 7, 1920.
6 SHEETS—SHEET 5.

Inventor
Wm. J. Van Osdel
By [signature]
Atty

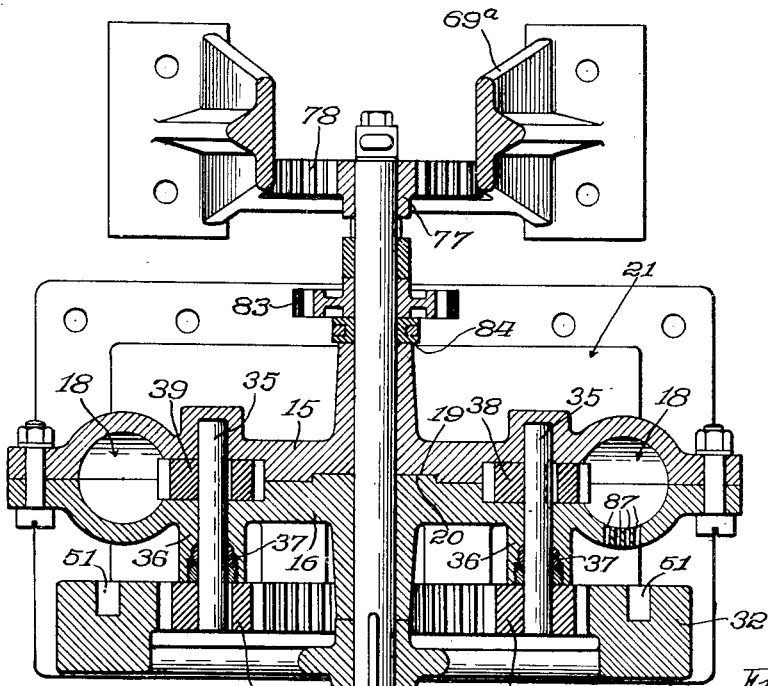
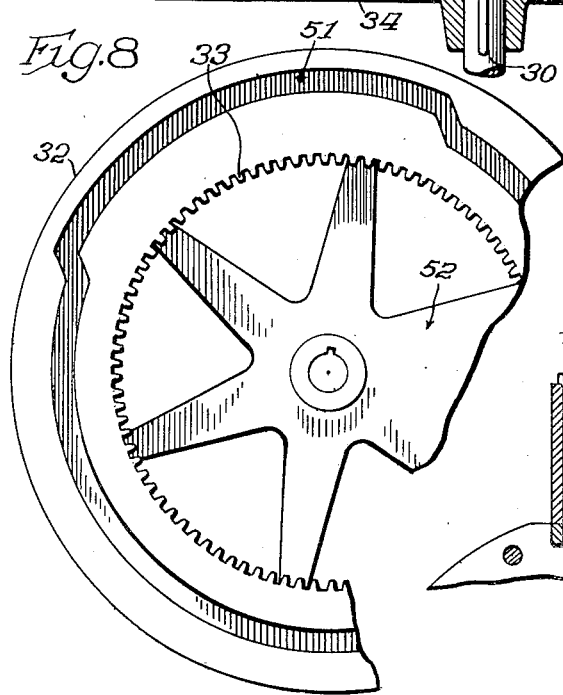
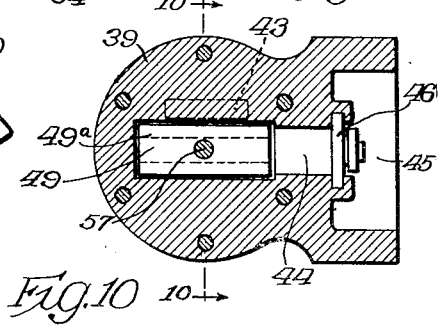
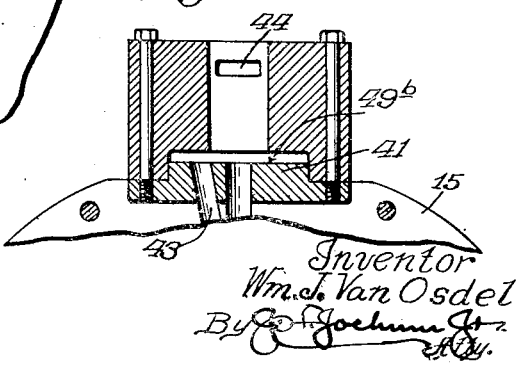

UNITED STATES PATENT OFFICE.

WILLIAM J. VAN OSDEL, OF CHICAGO, ILLINOIS.

ROTARY ENGINE.

1,351,933. Specification of Letters Patent. Patented Sept. 7, 1920.

Application filed February 3, 1919. Serial No. 274,679.

*To all whom it may concern:*

Be it known that I, WILLIAM J. VAN OSDEL, a citizen of the United States, residing at Chicago, in the county of Cook and State of Illinois, have invented certain new and useful Improvements in Rotary Engines, of which the following is a specification.

This invention relates to improvements in rotary engines and one of the objects of the invention is to provide an improved engine of this type embodying a floating piston and a plurality of separate elements adapted to be successively engaged and actuated by the piston whereby a steady and continuous rotation will be imparted to a driven element or shaft.

A further object is to provide an improved rotary engine of this character embodying a shiftable abutment coöperating with the piston and movable into and out of the path of movement of the piston, and also embodying means whereby the abutment will be actuated at predetermined points with respect to the operation of the piston, so as not to interfere with the operation of the piston.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 1 is a front elevation of an improved engine of this character constructed in accordance with the principles of this invention.

Fig. 2 is a rear elevation.

Fig. 3 is a vertical sectional view as taken on line 3—3, Fig. 1, and showing the engine as adapted for use with an explosive charge.

Fig. 4 is a view similar to Fig. 3 showing the engine as adapted for use with steam.

Fig. 5 is a detail perspective view of the shiftable abutment.

Fig. 7 is a horizontal sectional view as taken on line 7—7 Fig. 1.

Fig. 8 is an enlarged detail view of the inner face of the fly wheel showing the cam groove for shifting the abutment.

Fig. 9 is a detail sectional view taken on line 9—9 Fig. 1.

Fig. 10 is a detail vertical sectional view taken on line 10—10 Fig. 9.

Fig. 11 is a detail end elevation of the piston packing ring.

Fig. 12 is a sectional view on line 12—12 Fig. 11.

Figure 6:
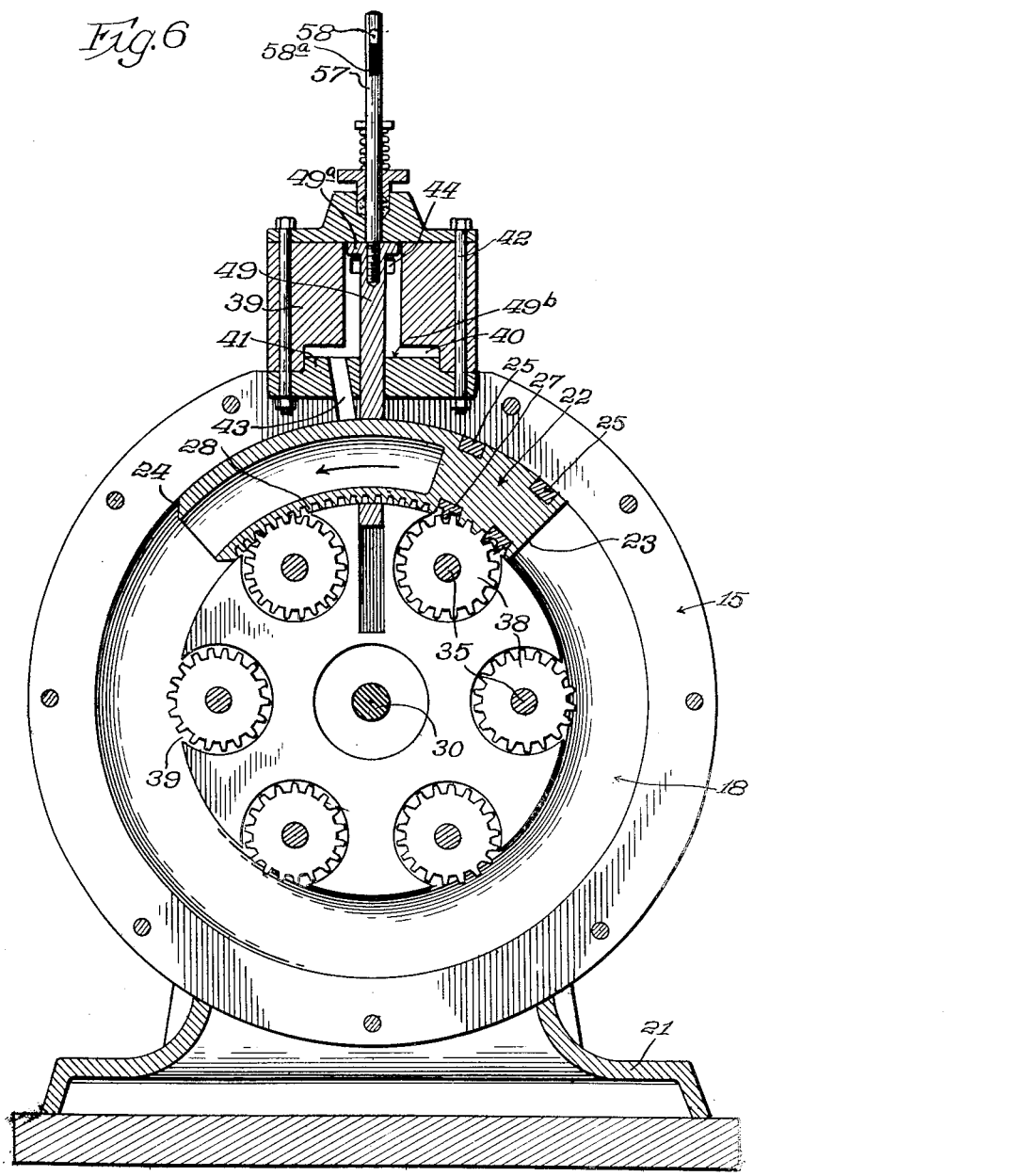
Fig. 6 is a vertical sectional view taken on line 6—6 Fig. 3.

Referring more particularly to the drawings, the engine frame is preferably constructed of two sections 16—16 secured together by suitable fastening devices 17, and the members of the frame are respectively provided with open grooves which coöperate when the sections are assembled to form an annular chamber or cylinder 18. In order to hold the frame members in proper relative position, one of the members may be provided with one or more recesses 19 in its inner face and the other member is provided with coöperating projections 20 adapted to be seated in the recesses.

The cylinder thus constructed is supported by a suitable base 21. Freely rotatable within the cylinder 18 is a floating piston 22 which is preferably of an arc shape construction of any suitable length. The end 23 of the piston is straight and the other end is preferably beveled as at 24 for a purpose to be set forth. The piston is provided with suitable packing rings 25 and these rings are open so as to permit them to be placed upon and removed from the piston, and the rings are also reinforced by the portion 26 which is preferably flat and coöperates with the flattened portion on the piston 22 formed at the bottom of the seats 27 and in which seats the packing rings are arranged. This flattened portion 26 not only reinforces the packing ring but prevents it from shifting around the piston. The piston 24 is provided with rack teeth 28 which extend in a direction lengthwise of the piston and if desired the packing rings may be also provided with one or more teeth adapted to coöperate and form continuations of the teeth 28.

A driven shaft 30 is rotatably supported in bearings 31 in the frame or casing members and extends transversely of the cylinder 18 to be encompassed thereby, and carried by the shaft 30 to rotate therewith is a fly wheel 32 of any desired diameter. This fly wheel is provided with internal teeth 33 with which teeth a series of pinion gears 34 mesh. These gears 34 are spaced from each other and are each connected with a shaft 35 journaled in suitable bearings 36 and which bearings are provided with stuffing box elements 37. The shafts 35 extend transversely of the cylinder 18 and connected with each of these shafts to rotate therewith is a pinion gear 38. These pinion gears are arranged to project for a short distance through suitable openings 39 into the cylinder 18 so that as the piston 22 travels in the cylinder, the rack teeth 28 will successively engage the pinions 38 to impart rotation thereto, and as the pinion gears 34 are connected with the pinions 38, motion will be imparted thereto and the pinion gears 34 will in turn impart a rotary motion to the fly wheel 32 to drive the shaft 30. Supported by the casing or frame of the engine is a chamber 39 which may be constructed in any suitable manner, and the casing thereon is recessed as at 40 to receive a projection 41 on the frame and the chamber is secured in position by suitable fastening bolts 42, the projecting portion 41 serving as a means for assisting in holding the chamber in position. This chamber 39 has connection with the interior of the cylinder 18 by means of a suitable port or passage 43 whereby the motive charge will be delivered into the cylinder to operate upon the piston. The piston 22 has a constant direction of motion and is adapted to open and close this port 43.

The motive charge is supplied to the chamber 39 through a port 44 and which port has connection with a valve chamber 45, in which a valve 46 reciprocates and which valve is adapted to open and close the port 44. This is accomplished in any suitable manner such as by means of a piston rod 47 which receives its motion in a manner to be hereinafter set forth.

The motive charge is supplied to the chamber 45 through a suitable opening 48.

An abutment 49 is provided and operates in the chamber 39. This abutment comprises a body portion of a suitable length, so as to extend into the cylinder 18 and across the path of movement of the piston 22. The abutment is provided with an opening 50 therethrough which is adapted to be moved into and out of register with the cylinder 18 and when the opening 50 is in register with the cylinder 18, the piston 22 will pass therethrough.

After the piston has passed through this opening, the abutment is again shifted so as to extend across the cylinder to form an abutment between which and the end 23 of the piston 22, the motive charge is delivered to operate upon the piston and drive the same forwardly in the cylinder. As the other end 24 of the piston approaches the abutment 49, the latter is again shifted so as to bring the opening 50 into register with the cylinder to permit the piston to pass. During the traveling movement of the piston it will be manifest that the rack teeth 28 will always be in mesh with at least one of the pinions 38 thereby imparting a steady and continuous rotation to the fly wheel 32 as well as the driven shaft 30.

The abutment 49 may be shifted in any desired or suitable manner but preferably by mechanism which will now be described.

The fly wheel 32 is provided with a cam groove 51 and also a counter-balancing weight 52 so as to cause the fly wheel to run steady. The rocking arm 53 is pivotally mounted as at 54 to a support 55 connected with the engine casing. One end 56 of the arm 53 is connected with a stem 57 connected with the abutment 49 by means of a pin and slot connection 58—59. An element 60 is pivotally connected as at 61 with the arm 53 and moves in a guide 62, and terminates adjacent the cam groove 51 in the fly wheel. Connected with the free end of the element 60 is a roller 63 which moves in the cam groove 51, so that when the fly wheel is rotated, the abutment 49 will be shifted by the operation of these coöperating elements. If desired and in order to prevent rotation of the element 60 in the guide 62 there may be provided a pin and slot connection 64—65 between the element 60 and the wall of the guide 62.

To prevent the motive fluid from escaping around the abutment 49, the abutment is provided with a shoulder 49$^A$ which abuts the seat 49$^B$, and is held against the seat by the tension of spring 58$^A$.

The form of the invention shown in Fig. 3 is adapted for use as an internal combustion engine and to that end, means are provided for compressing and supplying a charge of explosive fuel to the chamber 45. This means may embody a cylinder 69 supported adjacent the chamber 45 by means of a suitable support 69$^A$, and a piston 70 is reciprocable in the cylinder. The fuel is supplied to the cylinder through an inlet 71 controlled by a spring controlled valve 72 and leading from the cylinder is an outlet 73 which has communication with the inlet 48 of the chamber 45. A spring controlled valve 74 is provided for controlling the inlet 48 and the charge which has been compressed and delivered into the chamber 45 is ignited or exploded by any suitable means or device, such as a spark plug 75.

The piston 70 is reciprocated in the cylinder 69 in any suitable manner such as by means of a piston rod 76 which receives its motion preferably from the driven shaft 30 through the medium of a gear wheel 77 connected with the shaft. This gear wheel meshes with another gear 78 connected with a shaft 79 journaled in a suitable bearing 80. The gear 78 is connected with the piston rod 76 by means of a crank pin 81, so that when the gear 78 is rotated, a reciprocating movement will be imparted to the piston 70.

Connected also with the shaft 79 is a gear 82 which meshes with a gear 83 loosely carried by the shaft 30, preferably adjacent the gear 77. Connected with the gear 80 to rotate therewith is an eccentric 84 with which a rod 85 is connected and this rod 85 has pivotal connection with the valve rod 47 so that when the shaft 30 is rotated, the gear 83 will also be rotated through the medium of the gears 77—78—82. This will rotate the eccentric 84 which will in turn impart a reciprocating movement to the valve 46 and thereby open and close the port 44.

With this form of the invention it will be manifest that the explosive charge will enter the inlet 71 when the piston is moved in one direction to draw the charge in past the valve 72. When the piston moves in the opposite direction the charge will be compressed and at the same time when the pressure reaches a predetermined amount the charge will be forced out of the opening 73 into the inlet 48 and past the valve 74 into the chamber 45, where it will be exploded and as the charge is exploded the valve 46 will assume a position to uncover the port 44 admitting the motive fluid into the casing 39 from where it will flow through the port 43 into the cylinder 18 and between the abutment 49 and the end 43 of the piston, so as to operate upon the piston to impel or drive the piston forwardly in the cylinder. This advancing movement of the piston will, through the medium of the rack 48 and pinions 38, rotate the fly wheel 32 which in turn, being secured to the shaft 30 for rotation therewith, will rotate the shaft. The rotation of the shaft 30 will impart a reciprocating movement to the piston 70 in the manner already described, that is to say, through the medium of the gears 77—78 and piston rod 76. The rotation of the gear 78 will also be imparted to the shaft 79, gear 82, gear 83 and eccentric 84 to reciprocate to the valve 46 to open and close the port 44 in a manner as already described.

When it is desired to employ the invention in connection with another motive fluid such for instance as steam, the cylinder 69, piston 70, gears 77, 78, 82 and 83 will be dispensed with, and in that event the eccentric 84 will be secured directly to the shaft 30 as shown in Fig. 4.

With this form of the invention, and with the arrangement as shown in Fig. 4, the valve 74 is also dispensed with and the motive fluid will then enter the chamber 45 through the inlet 48, to be delivered into the casing 39 through the port 44 when the valve 46 is shifted to open the port. This shifting movement being accomplished by the rotation of the eccentric 84 and through the medium of the connections 85—47 in a manner as just described.

The cylinder 18 may be provided with any suitable exhaust such as indicated at 87 as shown more clearly in Figs. 1 and 7, and the exhaust may be so located that it can be controlled by the piston 22 as it rotates in the cylinder 18.

While the preferred form of the invention has been herein shown and described, it is to be understood that various changes may be made in the details of construction and in the combination and arrangement of the several parts, within the scope of the claims, without departing from the spirit of this invention.

Obviously, the cylinder of the engine may be provided with any well known cooling means, either for water or air, suitable for the purpose.

What is claimed as new is:—

1. A rotary engine embodying a cylinder, a floating piston movable in the cylinder, a driven shaft separate from the piston, a plurality of separate pinions operatively connected with the shaft, and a rack connected with and extending substantially the entire length of the piston and successively engaging the pinions for driving the shaft, and an abutment movable into and out of the path of movement of the piston, said abutment having an opening therein and through which opening the piston passes.

2. A rotary engine embodying a cylinder, a floating piston movable in the cylinder, a driven shaft separate from the piston, a fly wheel operatively connected with the shaft for driving it, a plurality of independent pinions operatively related to the fly wheel for rotating the wheel, a rack connected with the piston and adapted to successively engage and rotate the pinions, said pinions being disposed about the axis of rotation of the fly wheel, a portion of each of the pinions projecting into the cylinder, an abutment movable into and out of the path of movement of the piston, said piston being movable through an opening in the abutment.

3. A rotary engine embodying a cylinder, a floating piston movable in the cylinder, a driven shaft separate from the piston, an operative connection between the piston and shaft, an abutment operating in the cylinder and movable into and out of the path of the piston, and means for actuating the abutment, said abutment being provided with an opening therethrough and through which opening the piston is movable when the abutment is in a predetermined position.

4. A rotary engine embodying an annular cylinder, a floating piston movable in the cylinder, a driven shaft separate from the piston, a fly wheel connected with the shaft, spaced pinion gears arranged along the path of movement of the fly wheel, a rack carried with the piston and movable successively into operative relation with the pinion gears to rotate them, said rack extending substantially the entire length of the piston, gear connections between the said pinion gears and the said fly wheel, an abutment operating in the cylinder and movable into and out of the path of movement of the piston, said abutment having an opening therethrough and through which opening the piston is movable, and means responsive to the movement of the fly wheel for actuating the said abutment.

5. A rotary engine embodying an annular cylinder, a floating piston movable in the cylinder, a driven shaft separate from the piston, a fly wheel connected with the shaft, spaced pinion gears arranged along the path of movement of the fly wheel, a rack carried with the piston and movable successively into operative relation with the pinion gears to rotate them, said rack extending substantially the entire length of the piston, gear connections between the said pinion gears and the said fly wheel, an abutment operating in the cylinder and movable into and out of the path of movement of the piston, said abutment being provided with an opening therethrough and through which opening the piston is movable, and means embodying cam mechanism operatively related to the fly wheel for positively actuating the said abutment in both directions of its movement.

6. A rotary engine embodying an annular cylinder, a floating piston movable in the cylinder, a driven shaft separate from the piston, a fly wheel connected with the shaft, spaced pinion gears arranged along the path of movement of the fly wheel, a rack carried with the piston and movable successively into operative relation with the pinion gears to rotate them, gear connections between the said pinion gears and the said fly wheel, an abutment operating in the cylinder and movable into and out of operative position with relation to the piston, and means for actuating the abutment, said abutment having an opening therethrough movable into register with the bore of the cylinder and through which opening the piston is adapted to pass.

7. A piston element for rotary engines, the body of the piston being constructed on an arc, gear teeth extending along one face and spaced in a direction lengthwise of the piston, said teeth extending substantially the entire length of the piston, one end of the teeth terminating at the active face of the piston.

8. A piston element for rotary engines, the body of the piston being constructed on an arc, and gear teeth extending along one face and spaced in a direction lengthwise of the piston, the ends of the piston being flat, the said teeth extending substantially the entire length of the piston and terminating at the active face of the piston.

9. A piston element for rotary engines, the body of the piston being constructed on an arc, and gear teeth extending along one face and spaced in a direction lengthwise of the piston, and packing rings encompassing the piston, the said teeth extending substantially the entire length of the piston, one end of the teeth terminating at the active face of the piston.

10. A piston element for rotary engines, the body of the piston being constructed on an arc, and gear teeth extending substantially the entire length of, along one face and spaced in a direction lengthwise of the piston, the ends of the piston being flat, the periphery of one end being also beveled, one end of the said teeth terminating at the active face of the piston.

11. A rotary engine embodying an annular cylinder, a floating piston operating in the cylinder and in a constant direction of motion, a driven element separate from the piston, and an operative connection between the piston and the said driven element, the said connection embodying a plurality of spaced gears arranged along the path of movement of the piston and a rack carried with and extending substantially the entire length of the piston and adapted to operate successively upon the said gears as the piston travels in the cylinder, one end of the rack terminating at the active face of the piston.

12. A rotary engine embodying an annular cylinder, a floating piston operating in the cylinder and in a constant direction of motion, a driven element separate from the piston, an operative connection between the piston and the said driven element and embodying a plurality of spaced gears arranged along the path of movement of the gears and a rack carried with and extending substantially the entire length of the piston and adapted to operate successively upon the said gears as the piston travels in the cylinder, a shiftable abutment operating in the cylinder and movable into and out of the path of movement of the piston and through an opening in which abutment the piston passes, and means responsive to the operation of the said gears for shifting the abutment.

13. A rotary engine embodying a cylinder, a floating piston working in the cylinder and having a constant direction of movement, a driven element, an operative connection between the said element and the piston, an abutment movable into and out of the path of movement of the piston and through an opening in which abutment the piston passes, a chamber for delivering a motive charge to the cylinder between the abutment and piston and embodying a port, a valve for controlling the port, means for actuating the valve, and means for exploding the charge in the said chamber before the said valve is actuated to open the said port.

14. A rotary engine embodying a cylinder, a floating piston working in said chamber and having a constant direction of movement, a driven element, an operative connection between the piston and the said element, an abutment coöperating with the piston and through an opening in which abutment the piston passes, a chamber for delivering a motive charge to the cylinder between the piston and the abutment and embodying a port, a valve for controlling the port, means for compressing and delivering the motive charge to the said chamber, and means for exploding the charge in the said chamber before the said valve is actuated to open the said port.

15. A rotary engine embodying a cylinder, a floating piston working in said chamber and having a constant direction of movement, a driven element, an operative connection between the piston and the said element, an abutment coöperating with the piston and through an opening in which abutment the piston is adapted to pass, a chamber for delivering a motive charge to the cylinder between the abutment and piston and embodying a port, a valve for controlling the port, valve operating mechanism, means for compressing and delivering the motive charge to the said chamber, and means for exploding the charge in the said chamber before the said valve is actuated to open the said port, the said valve operating mechanism, and the said compressing and delivering means being responsive in their operation to the operation of the said driven element.

16. A rotary engine embodying a cylinder, a floating piston working in the cylinder, a driven element separate from the piston, an operative connection between the piston and driven element, an abutment coöperating with the piston and through an opening in which abutment the piston passes, a chamber for supplying a motive charge to the cylinder and embodying a port, a valve for controlling the port, means for operating the valve, means embodying a cylinder and piston for compressing a charge of the motive fluid and supplying the said charge to the chamber, means for operating the last recited piston in the last said cylinder, and means for exploding the charge in the said chamber before the said valve is actuated to open the said port.

17. A rotary engine embodying a cylinder, a floating piston working in the cylinder, a driven element separate from the piston, an operative connection between the piston and driven element, an abutment coöperating with the piston and through an opening in which abutment the piston passes, a chamber for supplying a motive charge to the center between the piston and abutment and embodying a port, a valve for controlling the port, means for operating the valve, means embodying a cylinder and the piston for compressing a charge of the motive fluid and supplying the said charge to the chamber, means operatively related to the said driven element for actuating the last recited piston, there being a passage between the last recited cylinder and the chamber, a valve for controlling said passage, and means for exploding the said charge in the said chamber before the said valve is actuated to open the said port.

18. A rotary engine of the character described embodying a piston element, rack teeth carried by the piston and arranged lengthwise thereof, a packing seat in the piston, a packing ring in the seat, and one or more gear teeth on the packing ring and forming a portion of the said rack teeth.

19. A rotary engine of the character described embodying a piston element, rack teeth carried by the piston and arranged lengthwise thereof, a packing seat in the piston, a packing ring in the seat, one or more gear teeth on the packing ring and forming a portion of the said rack teeth, and means for maintaining the packing ring against shifting movement about the piston.

20. A rotary engine of the character described embodying a piston element provided with a packing seat encompassing the piston, a packing ring in the seat, means for maintaining the packing ring against shifting movement about the piston, and coinciding rack teeth extending along one face of the piston and across the packing ring.

21. A rotary engine of the character described embodying a piston element provided with a packing seat encompassing the piston, a packing ring in the seat, said piston and ring being provided with coöperating flattened portions for maintaining the piston ring against shifting movement about the piston, and coinciding rack teeth extending along one face of the piston and across said packing.

22. A rotary engine of the character described embodying a piston element provided with a packing seat encompassing the piston, an open packing ring in the seat, a portion of the packing ring being reinforced transversely of the opening, said reinforcement operating to maintain the packing ring against shifting movement about the piston, and coinciding rack teeth extending along the piston and across said packing.

In testimony whereof I have signed my name to this specification, on this 30th day of January, A. D. 1919.

WILLIAM J. VAN OSDEL.